J. L. MILTON.
METHOD OF MAKING ELECTRIC COILS.
APPLICATION FILED NOV. 12, 1910. RENEWED OCT. 4, 1912.
1,046,211.
Patented Dec. 3, 1912.
3 SHEETS—SHEET 2.
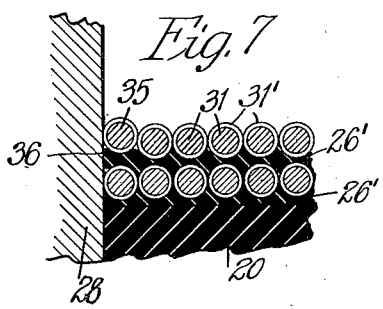
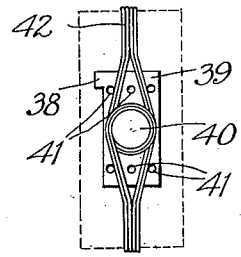
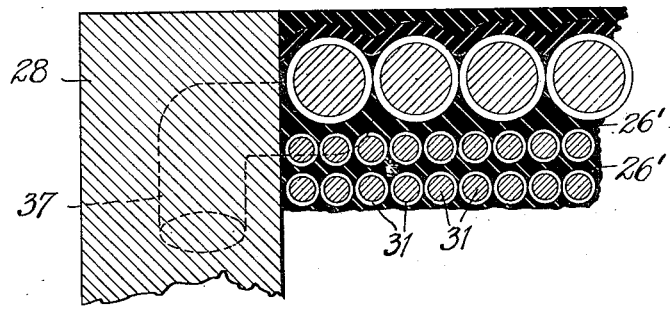
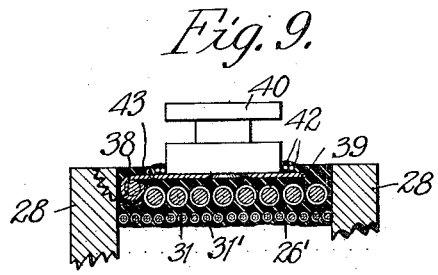
Witnesses:
Inventor
John L. Milton
By Brown Williams
Attorneys

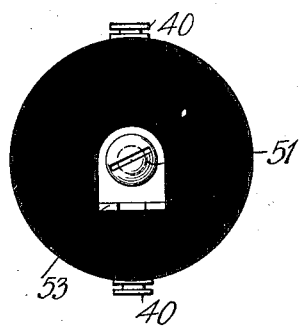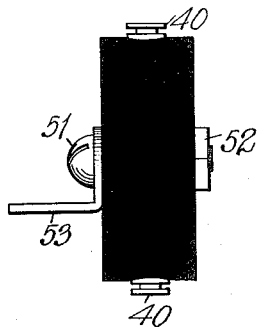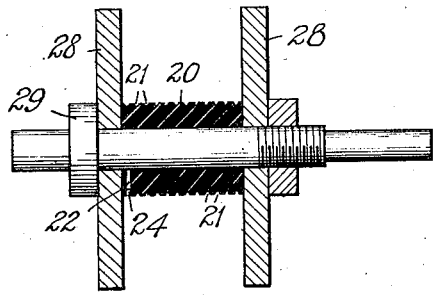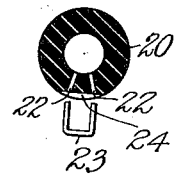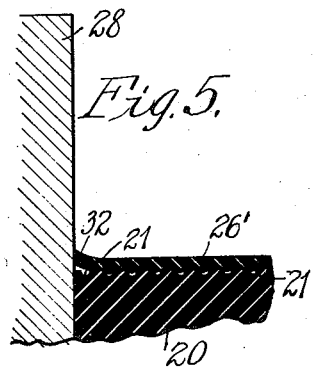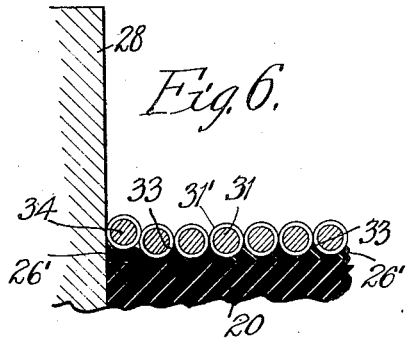

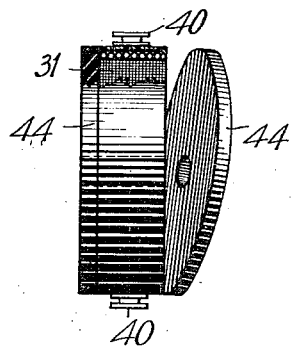
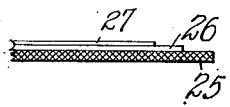
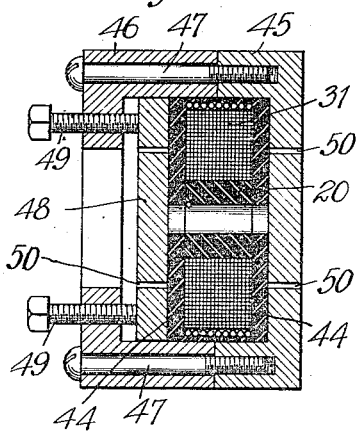
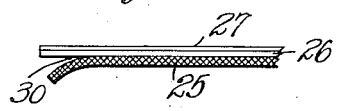
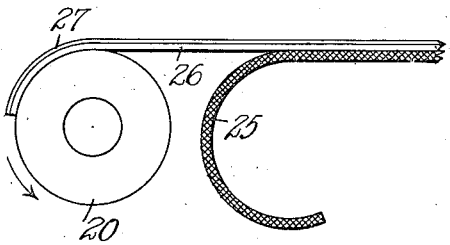

UNITED STATES PATENT OFFICE.

JOHN LEWIS MILTON, OF CHICAGO, ILLINOIS.

METHOD OF MAKING ELECTRIC COILS.

1,046,211.  Specification of Letters Patent.  Patented Dec. 3, 1912.

Application filed November 12, 1910, Serial No. 591,929. Renewed October 4, 1912. Serial No. 723,994.

*To all whom it may concern:*

Be it known that I, JOHN L. MILTON, a citizen of the United States, residing at Chicago, in the county of Cook and State of Illinois, have invented a certain new and useful Improvement in Methods of Making Electric Coils, of which the following is a full, clear, concise, and exact description, reference being had to the accompanying drawings, forming a part of this specification.

My invention relates to high-tension electrical coils and particularly to the process of forming them.

It was my aim in connection with the development of a high-tension ignition system for internal combustion engines, and particularly those used on automobiles, to make an induction coil of the Tesla type,—that is, a coil having a secondary winding of wire over which is wound a primary winding of coarser wire and in which there is no iron core.

It was my object to develop a coil of this general type which might be attached directly to each of the spark plugs of a multi-cylinder engine. This meant necessarily that the coil would be subjected to a high temperature, due to its proximity to the cylinder of the engine. It would also be subjected to oil and grease and generally to very severe conditions of use.

Ordinarily, coils used in ignition work are impregnated with wax to establish and maintain the very high degree of insulation necessary. Subjected to the use to which I proposed to put my coils, however, the wax would soon melt and the coil would be destroyed. I decided, therefore, if possible, to make a coil in which the several layers of wire and the several conductors of each layer would be insulated from one another by rubber which would withstand the high degree of heat and the oil and grease to which the coil would be subjected. Attempts to build coils thus insulated with rubber proved that the result was not at all easily accomplished. It apparently would be necessary to use vulcanized rubber in order to gain the necessary strength and rigidity in the completed coil. In order that rubber may be vulcanized it must contain sulfur, and in attempting to vulcanize rubber in and around the copper wire, which was a practical necessity, I found that the copper was attacked chemically by the sulfur, thus seriously impairing the conductivity of the wire. The compound of sulfur and copper, furthermore, formed a conductive path which was readily traversed by the high-tension currents, with the result that the coils thus made proved useless for the intended purpose. Another thing which I discovered in my efforts to make the required coil was that the silk insulation which would ordinarily be provided upon the fine wire intended for the secondary winding would not withstand the high temperature necessary to vulcanize the rubber. Another difficulty was encountered in attempting to vulcanize the coils, due to the chemical action of the sulfur upon the iron molds used for vulcanizing purposes. The sulfids thus formed would strike into the coil and destroy the insulation and in addition make the finished coil very dirty. Altogether the problem became a very difficult one, and it was only after a long series of trials and experiments and after the invention of the process herein described that it became possible to construct the coil which I had set as my goal.

It was my aim that all of the interstices between the conductors of the finished coil should be completely filled with rubber. I found that if any air pockets were left between the several conductors in the finished coil, these would form easy paths for the high-tension current and it became necessary, therefore, to avoid entirely the inclusion of any such pockets within the mass of the completed coil.

Without recounting the many trials of various steps and processes which I made before success had been attained, I shall proceed at once to a description of the process which finally eventuated and which has resulted in the production of coils giving the most complete satisfaction in service.

Generally stated, the process of my invention consists in the winding of successive layers of wire, there being wound between each successive layer of wire a layer of duplex rubber gum which I devised especially for the purpose. I shall refer more particularly to this rubber material thus laid between the layers of wire. Suffice it now to say that these alternate layers of rubber gum and wire are laid up until the necessary number of layers have been wound.

The rubber which is laid between the successive layers of wire is preferably quite tacky and very soft and pliable. The necessity for extreme pliability resides in the fact that the wire is wound under some tension with the purpose of compressing the layer of rubber which has been laid over the next lower coil in such a way as to force the rubber into the grooves between the lower layer of wire. Not only is the rubber forced into the grooves between the wires of the layer beneath that which is being wound, but the rubber is also crowded up into the grooves between the layer which is being wound, the rubber being thus made in a large measure to fill the interstices between the conductors of a given layer of wire and between the conductors of one layer and the next succeeding layer.

Without describing now certain details which are important in connection with these steps of the process, I may state that when the several layers of wire have been laid in this way, preferably between the flanges of a rigid spool, the supporting flanges are removed and replaced with rubber flanges of special composition. These adhere to the tacky rubber which is exposed at the end of each layer. Terminals having preferably been attached to the ends of the coils, the whole is clamped very tightly in a vulcanizing mold of tin or aluminum and heated to the required temperature. This vulcanizing process tends to expand the rubber to a certain extent and the interstices between the conductors are thus completely filled with rubber. Furthermore, the rubber flanges become firmly attached to, or perhaps rather made a part of, the rubber which fills the spaces between the conductors.

The rubber which I use is a special combination, comprising alternate layers of compounded rubber containing a considerable percentage of sulfur and of pure rubber gum such as Pará gum. The Pará gum is rolled into a very thin sheet and is applied to the compounded rubber sheet before the duplex rubber tape thus formed is wound into the coil. The sheets of Pará gum which I use for this purpose are known in the rubber trade as gutta-percha tissue. I have found that the duplex rubber above described does not attack the copper wire as would the rubber ordinarily employed for vulcanizing purposes. Furthermore, I employ a copper wire which is thoroughly well tinned to afford protection against the attack of the sulfur contained in the rubber. As a further preventive against the chemical combination of the sulfur in the copper of the wire I employ a lower temperature for vulcanization than is ordinarily employed, the period during which the vulcanizing process is carried on being extended, if necessary, in order that the rubber may be effectually cured. I shall describe this and the various details of the process of my invention in connection with the accompanying drawings, in which—

Figure 1 is a front elevation of a completed coil; Fig. 2 is a side elevation of the same; Fig. 3 is a view largely in cross-section of the hub and spool and arbor upon which the coil is wound; Fig. 4 is a cross-sectional view of the hub, taken near one end to show the method of connecting one end of the secondary coil with its terminal; Figs. 5, 6 and 7 show various phases of the operation of winding the secondary coil, the views being partial cross-sections very much enlarged; Fig. 8 is a cross-sectional view showing the laying of the primary winding; Fig. 9 is a cross-sectional view showing the method of attaching a terminal to the primary winding; Fig. 10 is another view in plan of the terminal, showing the method of attaching it to the coil; Fig. 11 shows the method of affixing the rubber flanges to the front and back of the wire-wound section of the coil; Fig. 12 shows in cross-section a strip of the rubber tape with its fabric backing which is used between the successive layers of wire; Fig. 13 is a cross-sectional view of the duplex rubber tape slightly separated from its backing; Fig. 14 shows the manner of winding the tape upon the hub or core; and Fig. 15 shows in cross-section the mold containing the coil to be vulcanized.

Like reference characters are applied to the same parts throughout the various figures.

Now, to describe the process in detail and in the best manner in which it may be carried out so far as I am aware, I shall refer first to Fig. 3, which shows a hub 20 of vulcanized fiber, there being a series of small grooves 21, 21 turned on the periphery of this hub to make more firm the grip of the rubber which is to be laid thereon. Near one end of this hub the small holes 22, 22 are drilled to receive the U-shaped wire 23. A saw-slit at 24 serves to receive the head of this staple-shaped piece of wire and prevent it from projecting above the counter of the hub proper. The details of this conductor 23 and its placement in the hub are best illustrated in Fig. 4. Upon the hub 20 I first lay a layer of the duplex rubber tape. A piece of this material is shown in cross-section in Fig. 12, together with its fabric backing 25. This backing is of cotton or any firm tapelike material. It may be purchased in the rubber market already coated with the layer 26 of what is called compounded rubber gum. This is a gum containing, as I understand it, Pará rubber mixed with a greater or less content of cheaper and less tenacious gums. It contains also more or less sulfur.

One important step of the invention is to lay a layer of rubber between each layer of wire. If, however, this weak compounded rubber be made strong enough to be handled and put in place, it must be so thick that it will give the finished coil too great bulk, and will also make an inefficient coil. In order, therefore, to secure a thin rubber tape having the requisite strength, I combine the sheet of compounded rubber with a layer of pure Pará gum rolled to a thickness of but a few thousandths of an inch. This sheet rubber may be purchased in the market, where it is known as gutta-percha tissue. The layer of compounded rubber is shown at 26 and the layer of pure Pará rubber at 27, the latter being wholly uncured and containing no sulfur whatever. The compounded rubber is very sticky and the layer of Pará gum adheres firmly to it. This produces a rubber tape mounted upon a fabric backing, the fabric side of the rubber being very sticky or tacky and the other side of pure Pará rubber. The two layers of rubber adhere to each other as one and both to the fabric backing. The duplex rubber sheet having been prepared in this way, the rubber sheet together with the fabric backing is cut into strips of a width slightly greater than the distance between the metal flanges 28, 28 of the winding spool. The flanges having been clamped to the hub by the arbor 29 and this arbor having been mounted in a winding machine or lathe, an end of the duplex rubber sheet is separated from the fabric backing at 30, as shown in Fig. 13, and the end of the rubber is pressed firmly upon the hub 20. The rubber will stick tightly to the hub, thus enabling the operator to wind a layer of the rubber sheet about the hub while the fabric is pulled away from the rubber, as best illustrated in Fig. 14.

When a layer of rubber has been wound about the hub, the strip is cut off and the free end stuck down upon the circlet which has been wound about the hub. The connector 23 having been previously inserted through the holes of the hub, the rubber layer is cut away slightly just over this connector in order that the inner end of the fine secondary wire may be slipped under the connector and, if desired, the wire may be soldered thereto. Now the process of laying the wire is begun, the mandrel and spool being rotated and the wire being wound in a continuous layer across the spool from left to right. The copper wire 31 shown in several of the figures is, as previously stated, well tinned and then covered preferably with an insulation of cotton 31'. Fig. 5 shows in cross-section a part of the spool comprising the tinned winding flanges 28 and the hub 20 upon which the layer of duplex rubber has been laid. For convenience, in the figures other than 12, 13 and 14 I have shown the duplex rubber layer as a single sheet or strip of homogeneous material, where also it is marked with the reference letter 26'. It will be noted in Fig. 5 that the rubber strip was cut somewhat wider than the distance between the spool flanges 28, thereby causing the edges of the strip to be turned up where they engage the flanges as shown, for example, at 32. The purpose of this is to provide sufficient rubber at the end so that as the wire is wound, as shown in Fig. 6, the tension of the wire will not only force the rubber up into the grooves between the wires, as shown at 33, 33, but so also that when the wire 34 at the end of the layer is laid it will find sufficient end of the rubber to fill the space at the end of the rubber layer and to leave a good facing of rubber to which later the rubber flange may be attached. Fig. 6 is intended to show the first layer of the secondary coil in place except for the last turn which is just in the process of being brought down. The tension of the wire in winding should be regulated or adjusted so that the successive turns will thoroughly embed themselves in the rubber, as shown in Fig. 6. Fig. 7 shows the first layer of wire already in place. It shows also the second layer of wire in place except for the final turn 35 which is in the process of being laid. A second layer of duplex rubber tape 26' is laid over the first layer of wire just as the first layer of rubber was laid over the hub. Although duplex rubber tape which is used for this purpose does not have sufficient strength to permit of its being wound under tension to force the rubber between the grooves of the layer of wire already in place, the rubber is so plastic that the winding of the successive layer of wire will not only force the rubber between the grooves of the layer being wound, but also between the grooves of the layer already in place, as indicated in Fig. 7. Here again the layer of rubber is cut a little wider than the distance between the spool heads in order that the last turn may force the rubber fully into the space at 36, as indicated in Fig. 7. Not only does the last turn of a layer force the rubber fully to occupy the space at the end, but the first turn of the layer acts in like manner, so that the rubber is forced out to fill the spaces at both heads of the coil.

The grooves between the turns of a layer of wire suffice to hold the rubber between such layers securely in place. The grooves 21 aid in embedding the first layer of rubber firmly to the hub 20 in similar manner. When the requisite number of secondary layers of wire have been laid, the outer layer is covered with one or more layers of the duplex rubber tape. The primary winding of coarser wire is then wound in the same manner as were the several layers of the secondary winding. In the coils which I have made in accordance with this process a single layer of primary wire has been sufficient and such a single layer is shown in the drawings. For convenience in winding, I have provided a hole in the metal flange 28, as indicated in dotted lines at 37 in Fig. 8, and into this hole in the flange I insert the end of the wire which is to form the primary layer. The wire is then wound across the spool just as were the several layers of secondary wire, the rubber tape 26' being forced up into the grooves due to the tension of the primary wire while being wound. In this connection I may say that since the rubber must be forced a greater distance into the grooves of the larger wire, I find it desirable to wind the heavier wire under a correspondingly increased tension. When this coarser primary winding has been laid, and one or more layers of rubber wound upon it, I remove the end of the wire which was inserted in the hole in the spool head and slip it through the eye 38 of the terminal clip 39. The wire is preferably soldered within this eye to make a sure and permanent connection.

The style of the terminal is best illustrated in Fig. 10. It comprises the clip 39 into which the groove head 40 is riveted, as shown in Fig. 9. A series of holes 41, 41 provide openings through which the rubber is pressed in vulcanization, the rubber studs thus formed giving aid in holding the terminal clip in place. A linen thread 42 is also wound about the clip after it has been put in place and the eye 38 secured to the end of the primary winding. This done, a covering of the duplex rubber tape 43 is wound about the spool in one or more layers as may be desired. A terminal clip is attached to either end of the primary winding and the heads of the terminals are placed substantially diametrically opposite in the coils which I have constructed. When the terminals are thus in place and the whole coil bound around with the rubber tape, the partially completed coil is removed from the winding spool shown in Fig. 3 and the rubber heads 44, 44 are applied as illustrated in Fig. 11. These heads are of compounded rubber. For convenience, each disk or washer is provided with a hole which registers with the hole through the hub on which the coil is wound. In view of the sticky, tacky nature of the rubber tape which has been wound between the layers of wire and which has been forced out at the end of each layer, the disks of compounded rubber adhere strongly to the ends of the coil. The whole coil is then placed in the tin or aluminum mold shown in Fig. 15. The halves of the mold 45 and 46 are closed by means of the screws 47, 47. The plunger 48 is then pressed smartly against the whole coil by means of the clamp screws 49, 49 The capillary holes 50, 50 allow the escape of any air which may have been retained. The mold containing the coil is then placed in a vulcanizing oven or otherwise subjected to a vulcanizing temperature which, in the case of the gums which I have employed, is about 340 degrees Fahr. I have found that when this temperature was maintained for a period of about six hours, the vulcanization was complete or at least such as to give most excellent results in the finished coil. This temperature is not high enough to destroy the cotton insulation which in a coil of this kind I have found, therefore, to be much preferable to the silk insulation which ordinarily would be used upon the wire of the secondary winding. The process of vulcanization, furthermore, tends to expand the rubber and generally to cement it together so that the result is practically a tinned copper wire thoroughly embedded in a mass of vulcanized rubber. In other words, the interstices between the wire forming the coil proper are fully impregnated with vulcanized rubber. This, of course, is an excellent insulator and dielectric. When the interstices between the turns and the several layers are completely filled with rubber the sulfur of which has not attacked the copper of the wire, there results an extremely efficient coil for high-tension electrical transformation.

The process of vulcanization thoroughly cements or fuses the rubber heads to the several cylindrical layers of rubber which intervene between the layers of wire. There are, therefore, no air spaces either in the body of the coil or at the ends where the heads are vulcanized into homogeneity with the layers of rubber which intervene between the turns of wire. The result of my process is a coil also of very attractive appearance and of very small size as measured by its electrical output. Fig. 1 shows a front view of the finished coil. In Fig. 2 is shown a side elevation in which may be seen the terminal which is connected with the inner end of the secondary winding. This terminal consists of the machine screw 51 which is held in place by the nut 52, there being an L-shaped clip 53 which is clamped under the head of the screw 51. It will be remembered that a connector 23 was run through the hub from the inner end of the secondary winding, and as it is a high-tension current which is delivered from this winding, the electrical contact between the connector 23 and the screw 51 will ordinarily be sufficient without solder or other special device.

I realize that I have explained the several steps of this process in considerable detail, for the reason that I encountered unsuspected difficulties at almost every point in my attempt to produce the result required. I have thought best, therefore, to be explicit in my description of the process, but do not for this reason wish to be limited to non-essential details.

The scope of my invention is indicated only by the appended claims in which I state the invention which I desire to secure by Letters Patent:

1. The process which consists in alternately winding a layer of rubber tape comprising a layer of compounded rubber and a layer of guttapercha tissue and then winding a layer of cotton covered tinned copper wire, placing compounded rubber heads upon the ends of the coil thus formed and then vulcanizing the whole.

2. The process which consists in winding alternate layers of rubber and tinned copper wire, each layer of rubber comprising in turn a thickness of compounded rubber containing more or less sulfur and a thickness of pure Pará gum, the wire being wound under tension in order that the rubber may be forced into the grooves between the successive turns of wire, and then vulcanizing the whole under pressure.

3. The process which consists in winding a layer of cotton covered tinned copper wire, then winding a layer of duplex rubber tape over the layer of wire, then winding another layer of wire under tension in order to force the rubber into the grooves between successive turns of wire, then winding another layer of rubber and so on indefinitely the layers of rubber being formed of a thickness of compounded rubber containing more or less sulfur mounted upon a thin layer of guttapercha tissue, the tapes of rubber being cut slightly wider than the space to be occupied by the layers of wire when wound, applying compounded rubber heads to the ends of the coil, compressing the coil thus formed in a suitable mold and then vulcanizing the coil substantially as described.

In witness whereof, I hereunto subscribe my name this 22d day of August, A. D. 1910.

JOHN LEWIS MILTON.

Witnesses:
ALBERT C. BELL,
LEONARD E. BOGUE.